(12) United States Patent
Tarandek et al.

(10) Patent No.: US 12,162,462 B2
(45) Date of Patent: Dec. 10, 2024

(54) BRAKE ACTUATING UNIT FOR A BRAKE-BY-WIRE MOTOR VEHICLE BRAKE SYSTEM AND MOTOR VEHICLE BRAKE SYSTEM

(71) Applicant: HL MANDO CORPORATION, Gyeonggi-do (KR)

(72) Inventors: Kristijan Tarandek, Neu-Isenburg (DE); Hans-Jörg Feigel, Rosbach (DE); Young Song Lee, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 737 days.

(21) Appl. No.: 17/312,937

(22) PCT Filed: Dec. 11, 2019

(86) PCT No.: PCT/KR2019/017525
§ 371 (c)(1),
(2) Date: Jun. 11, 2021

(87) PCT Pub. No.: WO2020/122612
PCT Pub. Date: Jun. 18, 2020

(65) Prior Publication Data
US 2022/0048484 A1 Feb. 17, 2022

(30) Foreign Application Priority Data
Dec. 11, 2018 (DE) ...................... 10 2018 221 450.6

(51) Int. Cl.
*B60T 8/32* (2006.01)
*B60T 7/04* (2006.01)
(Continued)

(52) U.S. Cl.
CPC .............. *B60T 8/326* (2013.01); *B60T 7/042* (2013.01); *B60T 13/686* (2013.01);
(Continued)

(58) Field of Classification Search
CPC ........ B60T 8/326; B60T 8/4081; B60T 7/042; B60T 13/686; B60T 13/745; B60T 17/02;
(Continued)

(56) References Cited

U.S. PATENT DOCUMENTS

2014/0159473 A1 6/2014 Kuhlman
2015/0291279 A1 10/2015 Iordanidis et al.
(Continued)

FOREIGN PATENT DOCUMENTS

CN 103552556 2/2014
CN 105722736 A 6/2016
(Continued)

OTHER PUBLICATIONS

Office Action dated Jan. 12, 2023 for Korean Patent Application No. 10-2021-7021681 and its English translation from Global Dossier.
(Continued)

*Primary Examiner* — Vishal R Sahni
(74) *Attorney, Agent, or Firm* — Womble Bond Dickinson (US) LLP

(57) ABSTRACT

The present application relates to a brake actuating unit for a brake-by-wire motor vehicle brake system. The brake actuating unit comprises a housing, a first electrically controllable pressure supplying device, and a second electrically controllable pressure supplying device. The brake actuating unit further comprises a first connector for electrically connecting the brake actuating unit with a vehicle control unit and with a power network. The first connector is electrically connected with the first electrically controllable pressure supplying device. The brake actuating unit comprises a second connector for electrically connecting the brake actuating unit with the vehicle control unit and with the power network. The second connector is electrically connected with the second electrically controllable pressure
(Continued)

supplying device. The brake actuating unit comprises a first cylinder and piston arrangement disposed within the housing and a piston rod for transmitting a displacement of a brake pedal to a piston.

10 Claims, 4 Drawing Sheets

(51) Int. Cl.
*B60T 13/68* (2006.01)
*B60T 13/74* (2006.01)
*B60T 17/02* (2006.01)
*B60T 8/40* (2006.01)

(52) U.S. Cl.
CPC ............ *B60T 13/745* (2013.01); *B60T 17/02* (2013.01); *B60T 8/4081* (2013.01); *B60T 2270/402* (2013.01); *B60T 2270/404* (2013.01); *B60T 2270/82* (2013.01)

(58) Field of Classification Search
CPC .......... B60T 2270/82; B60T 2270/402; B60T 2270/404
See application file for complete search history.

(56) References Cited

U.S. PATENT DOCUMENTS

| | | | | |
|---|---|---|---|---|
| 2018/0065605 | A1* | 3/2018 | Leiber | ................ B60T 13/745 |
| 2018/0186353 | A1* | 7/2018 | Lee | ................... B60T 13/166 |
| 2018/0290640 | A1* | 10/2018 | Johnson | ................ B60T 13/662 |
| 2019/0100182 | A1* | 4/2019 | Leiber | ................. B60T 13/142 |
| 2020/0047731 | A1* | 2/2020 | Reuter | ................. B60T 13/146 |
| 2020/0114894 | A1* | 4/2020 | Leiber | ..................... B60T 7/12 |
| 2020/0172068 | A1* | 6/2020 | Leiber | ................. B60T 8/1755 |
| 2020/0254989 | A1* | 8/2020 | Kawakami | ............... B60T 8/17 |
| 2020/0290581 | A1* | 9/2020 | Kawakami | .............. B60T 13/18 |
| 2021/0122349 | A1* | 4/2021 | Leiber | ................... B60T 7/042 |

FOREIGN PATENT DOCUMENTS

| | | |
|---|---|---|
| CN | 106828468 | 6/2017 |
| JP | 2006-151129 | 6/2006 |
| KR | 10-2016-0057429 | 5/2016 |
| KR | 10-2018-0123130 | 11/2018 |

OTHER PUBLICATIONS

Office Action dated Jul. 31, 2023 for Korean Patent Application No. 10-2021-7021681 and its English translation from Global Dossier.
Office Action dated Oct. 14, 2023 for Chinese Patent Application No. 201980091173.X and its English machine translation by Google Translate.
International Search Report for PCT/KR2019/017525 mailed on Apr. 10, 2020 (now published as WO 2020/122612).
Written Opinion of the International Searching Authority for PCT/KR2019/017525 mailed on Apr. 10, 2020 (now published as WO 2020/122612).
Office action from corresponding Chinese Patent Application No. 201980091173.x issued on Mar. 8, 2024 with English translation by Google Translate.

\* cited by examiner

BRAKE ACTUATING UNIT FOR A BRAKE-BY-WIRE MOTOR VEHICLE BRAKE SYSTEM AND MOTOR VEHICLE BRAKE SYSTEM

CROSS-REFERENCE TO RELATED APPLICATIONS

This application is the U.S. National Stage of International Patent Application No. PCT/KR2019/017525 filed on Dec. 11, 2019, which claims the priority to German Patent Application No. 10 2018 221 450.6 filed in the German Intellectual Property Office on Dec. 11, 2018, the entire contents of which are incorporated herein by reference.

BACKGROUND

1. Field

The present application relates to the field of brake systems for motor vehicles. In particular, the present application relates to a brake actuating unit for a brake-by-wire motor vehicle brake system. In addition, the present application relates to a brake-by-wire motor vehicle brake system comprising the brake actuating unit.

2. Description of Related Art

Various motor vehicle brake systems are known. For example, brake-by-wire systems may comprise a master cylinder and piston arrangement which may be actuated by a brake pedal to compress hydraulic fluid. A pedal travel sensor may be coupled to the brake pedal to detect and amount of travel of the brake pedal. The corresponding signal may be sent to a controller, which may control a pressure supplying device based on the amount of travel of the brake pedal. The pressure supplying device is hydraulically coupled with the wheel brakes. Further, a pedal feel simulator coupled with one of the master cylinder outputs may be provided to mimic the feel of a hydraulic coupling between the brake pedal and the wheel brakes. In addition, as a fallback mode, the master cylinder is in communication with the wheel brakes directly in case of failure, so that an actuation of the brake pedal causes braking directly. Related prior art is described, e.g., in document US 2014/0159473 A1.

The brake system described above, however, may not be suitable for HAD (highly automated driving), as the driver of the vehicle may not always be attentive and therefore may not be able to actuate the brake pedal in case of a system failure. Therefore, there is a desire for compact solutions that are capable with the safety requirements in HAD scenarios.

SUMMARY

In view of the aforementioned aspects, it is an object of the present application to provide a brake actuating unit for a brake-by-wire motor vehicle brake system and a brake-by-wire motor vehicle brake system which are safe and particularly compact.

These objectives are achieved by a brake actuating unit comprising the features of independent claim 1 as well as a brake system comprising the features of another claim. Optional further features and further developments will become apparent from the dependent claims and the detailed description in conjunction with the accompanying figures.

The proposed brake actuating unit for a brake-by-wire motor vehicle brake system comprises a housing, a first electrically controllable pressure supplying device, a second electrically controllable pressure supplying device, and a brake pedal actuation sensing device. The brake pedal actuation sensing device is electrically connected with at least one of the first electrically controllable pressure supplying device and the second electrically controllable pressure supplying device. The brake actuating unit further comprises hydraulic connections for connecting wheel brakes of the brake system with the first pressure supplying device and the second pressure supplying device. The brake actuating unit further comprises a first connector, in particular a first socket, for electrically connecting the brake actuating unit with a vehicle control unit and with a power network of the vehicle. In addition, the first connector is electrically connected with the first electrically controllable pressure supplying device. Further, the brake actuating unit comprises a second connector, in particular a second socket, for electrically connecting the brake actuating unit with the vehicle control unit and with the power network of the vehicle. The second connector is electrically connected with the second electrically controllable pressure supplying device. The brake actuating unit further comprises a first cylinder and piston arrangement, in particular a master cylinder and piston arrangement, disposed within the housing and a piston rod extending through a rear face of the housing for transmitting a displacement of a brake pedal to a piston of the first cylinder and piston arrangement.

The first and second connectors as well as the first and second electrically controllable pressure supplying devices are configured to receive braking commands from the vehicle control unit. Typically, the first and second connectors each comprise at least one pin or socket contact for receiving the braking commands and at least one pin or socket contact configured to receive electrical power from the power network of the vehicle. The power network of the vehicle may be redundant, and the first and second connectors may each be configured to receive electrical power from a different one of two separate power supplies.

The proposed brake actuating unit enables a compact one-box design and enables a particularly safe vehicle brake system. In case of a partial system failure, braking of the vehicle may be achieved using the second electrically controllable pressure supplying device as a fallback mode. Typically, the first and second electrically controllable pressure supplying devices and the first and second connectors are rigidly connected with one another. In addition, these components may be rigidly connected with the first cylinder and piston arrangement to enable a particularly compact arrangement. The housing may be a single housing or may comprise multiple housing components which are rigidly connected with one another. The first electrically controllable pressure supplying device and the second electrically controllable pressure supplying device may be arranged within the housing.

The application further relates to a brake-by-wire motor vehicle brake system comprising the brake actuating unit described above or below and a first cable, a second cable, the vehicle control unit, and the vehicle power network. The first cable may electrically connect the first connector of the brake actuating unit with the vehicle control unit as well as with the vehicle power network. Further, the second cable may electrically connect the second connector of the brake actuating unit with the vehicle control unit as well as with the vehicle power network.

In some embodiments, at least one of the first connector and the second connector forms a part of a side face of the unit. The side face may be a lateral face of the unit with respect to a longitudinal axis of the first cylinder and piston arrangement. Typically, the first connector and the second connector form a part of a side face of the unit to enable a particularly space saving arrangement of the cables.

The first connector may form a part of a first face of the unit. Further, the second connector may form a part of a second face of the unit. The first face may be a side face of the unit opposite the second face. In this embodiment, the connectors may be arranged on opposing side surfaces of the unit.

In typical embodiments, the first connector and the second connector are elongated. An axis of elongation of the first connector may be oriented essentially parallel to an axis of elongation of the second connector. However, in other embodiments, an axis of elongation of the first connector may be oriented essentially perpendicular to an axis of elongation of the second connector.

The first electrically controllable pressure supplying device and/or the second electrically controllable pressure supplying device may comprise a second hydraulic cylinder and piston arrangement. Further, the first electrically controllable pressure supplying device and/or the second electrically controllable pressure supplying device may comprise an electric motor for supplying a pressure based on electric signals. The piston of the second hydraulic cylinder and piston arrangement may be displaceable by the electric motor. In some embodiments, the first electrically controllable pressure supplying device and the second electrically controllable pressure supplying device share a common hydraulic cylinder and piston arrangement. However, for an increased level of safety, the first electrically controllable pressure supplying device and the second electrically controllable pressure supplying device may each comprise a second hydraulic cylinder and piston arrangement. The cylinder of the second hydraulic cylinder and piston arrangement may be hydraulically coupled with the wheel brakes via the hydraulic connections and, if provided, via a hydraulic controller, as described below.

The electric motor may form a part of a side face of the unit. Further, at least one of the first connector and the second connector may be arranged in a front portion of the unit, the front portion being in front of the electric motor. The front portion may be a portion of the unit that is closer to a front of the motor vehicle when the unit is installed in the vehicle.

The brake actuating unit may further comprise a brake pedal feel simulator. The brake pedal feel simulator may be connected with the first cylinder and piston arrangement. The brake pedal feel simulator may be rigidly connected with the first and/or the second electrically controllable pressure supply. In some embodiments, the brake pedal feel simulator is arranged within the housing. The brake pedal feel simulator may mimic the feel of an all-hydraulic actuation of the wheel brakes when the brake pedal is pushed.

The brake actuating unit may further comprise a hydraulic controller. The hydraulic controller may be connecting the first and/or the second pressure supply with the wheel brakes. In most embodiments, the hydraulic controller is arranged within the housing. Further, the hydraulic controller may be rigidly connected with the first and/or the second pressure supply. The hydraulic controller may be configured to conduct antilock braking control (ABS) for suppressing slip of wheels and/or side skidding control and/or traction control for stabilizing behaviour of the vehicle. The hydraulic controller may comprise a valve arrangement having a number of valves for setting wheel-individual brake pressures.

In typical embodiments, the brake actuating unit further comprises a pressure medium reservoir. The pressure medium reservoir may be rigidly connected with the first and/or the second pressure supply. The pressure medium reservoir may form at least a part of a top face of the unit.

As is apparent from the above description, according to an embodiment, a brake actuating unit for a brake-by-wire motor vehicle brake system and a brake-by-wire motor vehicle brake system which are safe and particularly compact are provided.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
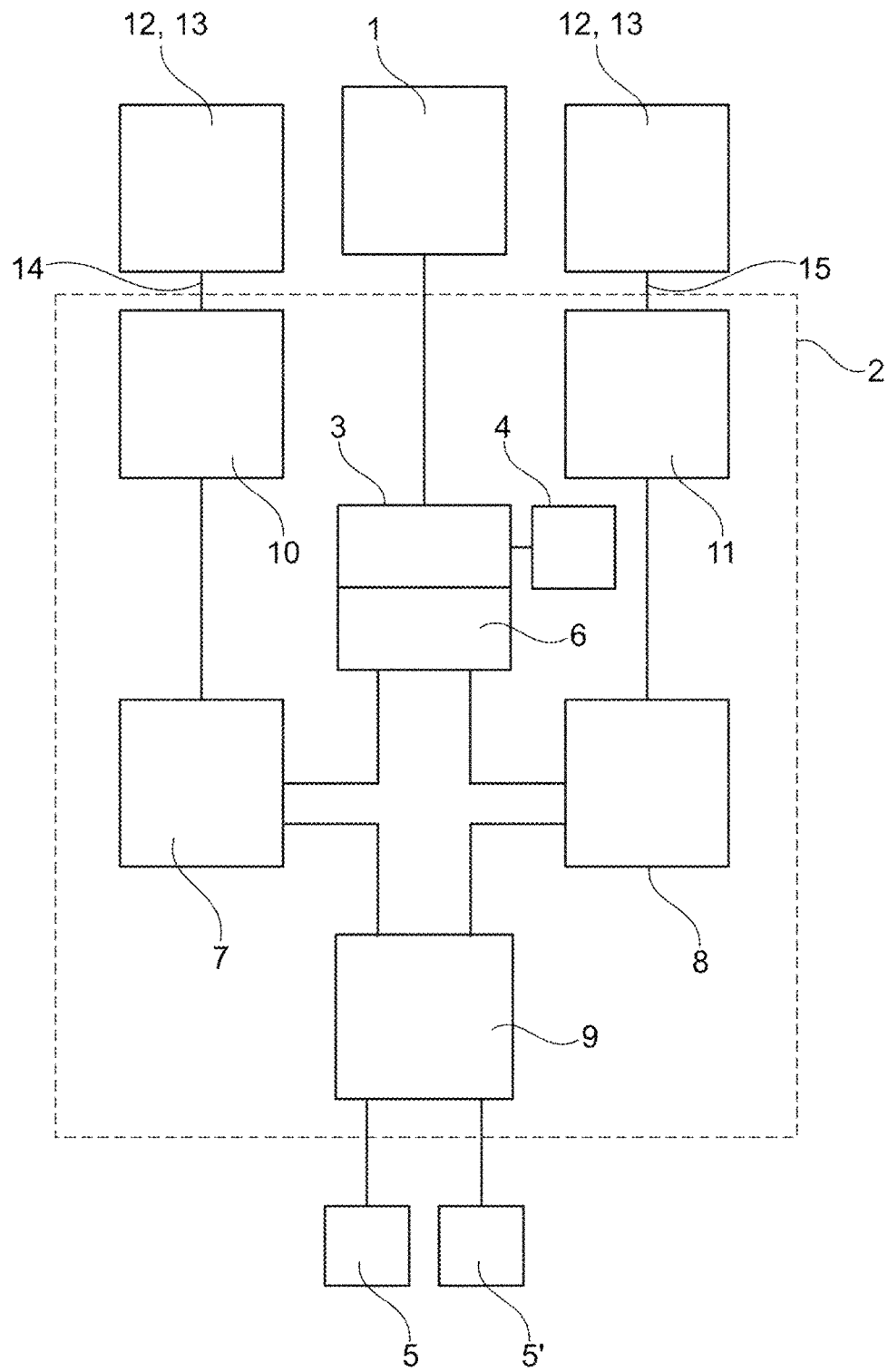
FIG. 1 is a schematic view of a brake-by-wire motor vehicle brake system.

FIG. 1 shows a schematic view of a brake-by-wire motor vehicle brake system. The brake system comprises a brake pedal 1 accessible by a driver of the vehicle. The brake pedal 1 is connected to a brake actuating unit 2 via a piston rod. The piston rod is mechanically coupled with a piston of a first cylinder and piston arrangement 3. The first cylinder and piston arrangement 3 comprises a tandem cylinder hydraulically connected with a brake pedal feel simulator 4. The tandem cylinder may further be hydraulically connectable with wheel brakes 5, 5' of the motor vehicle directly to provide a fallback mode in case of malfunction of the system (not shown).

The first cylinder and piston arrangement 3 is further coupled with a brake pedal actuation sensing device 6 configured to detect an amount of travel of the brake pedal 1. The brake pedal actuation sensing device 6 is configured to output signals corresponding to the amount of travel of the brake pedal 1 to a first electrically controllable pressure supplying device 7 and a second electrically controllable pressure supplying device 8. The first and second electrically controllable pressure supplying devices 7, 8 are configured to apply a hydraulic braking pressure to the wheel brakes 5, 5' based on the amount of travel of the brake pedal 1 and/or based on a braking signal provided by a vehicle controller 13.

To apply the hydraulic braking pressure, the first pressure supplying device 7 and/or the second pressure supplying device 8 may comprise a cylinder and piston arrangement and an electric motor driving the piston. In some embodiments, the first pressure supplying device 7 and the second pressure supplying device 8 each comprise a separate cylinder and piston arrangement and each comprise an electric motor. However, in other embodiments, the first pressure supplying device 7 and the second pressure supplying device 8 share a common cylinder and piston arrangement and electric motor. Further, a hydraulic controller 9 comprising an antilock braking system having a valve arrangement for setting wheel-individual brake pressures is hydraulically connected between the wheel brakes 5, 5' and the electrically controllable pressure supplying devices 7, 8. To supply the hydraulic pressure to the wheel brakes 5, 5' the first and second electrically controllable pressure supplying devices 7, 8 are each connected to the hydraulic controller 9 with hydraulic connections.

The first electrically controllable pressure supplying device 7 and the second electrically controllable pressure supplying device 8 are further electrically connected with a first connector 10 and a second connector 11, respectively. The first connector 10 and the second connector 11 are connected with a harness of the vehicle, more specifically with a power network 12 of the vehicle and with the vehicle control unit 13, using a pair of cables 14, 15. The wheel brakes 5, 5' may be controlled via braking signals sent from the vehicle control unit 13 to the first and second electrically controllable pressure supplies 7, 8. Further, the first and second electrically controllable pressure supplies 7, 8 are supplied with electrical energy from the power network 12 of the vehicle. For example, during normal operation in a highly automated driving scenario, the wheel brakes 5, 5' may be controlled using the first electrically controllable pressure supply 7. Upon detection of a malfunction of the first electrically controllable pressure supply 7 or the cable 14 or a part of the power network 12 that supplies the first electrically controllable pressure supply, the wheel brakes 5, 5' may be controlled using the second electrically controllable pressure supply 8.

Figure 2:
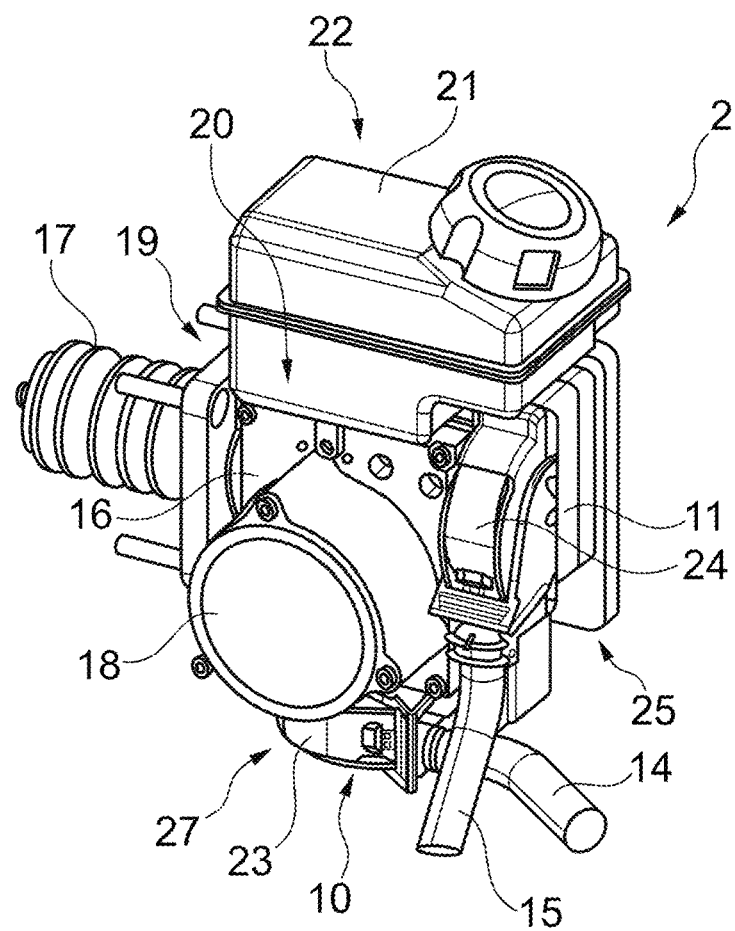
FIG. 2 is a perspective view of a brake actuating unit according to a first embodiment.
Figure 3:
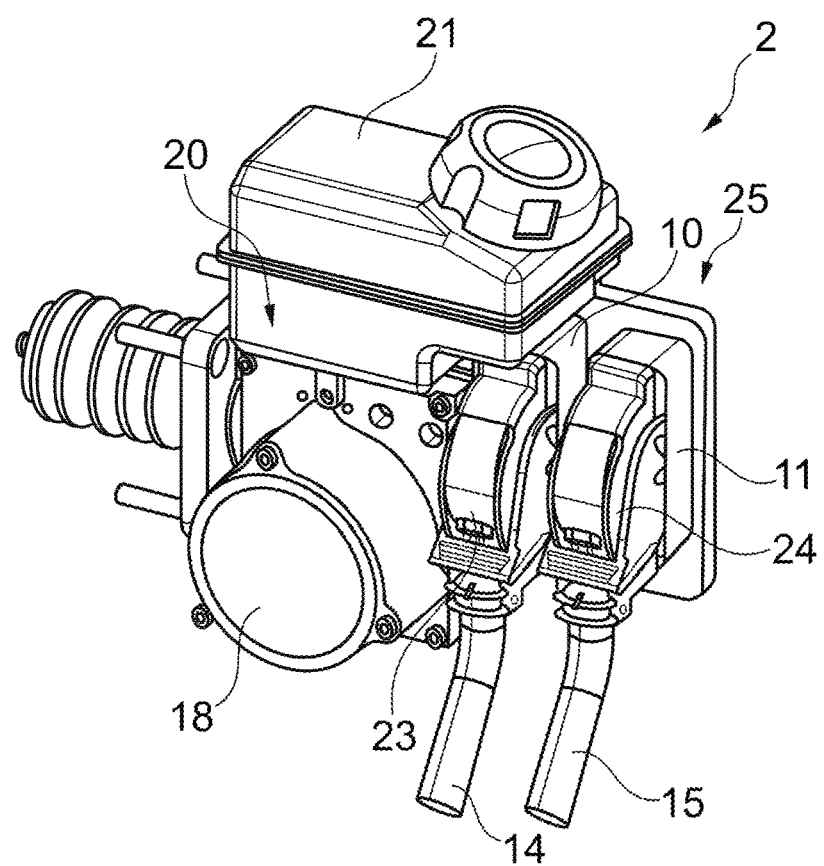
FIG. 3 is a perspective view of a brake actuating unit according to a second embodiment.
Figure 4:
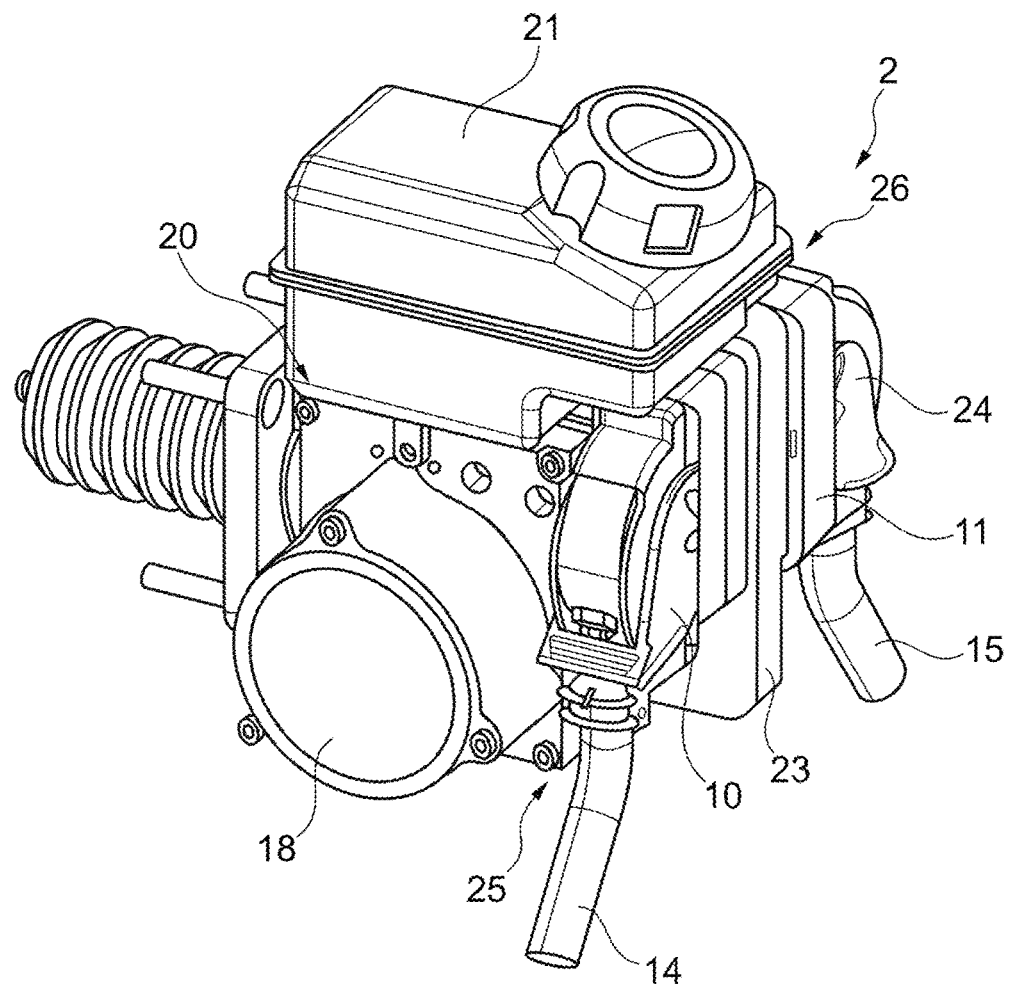
FIG. 4 is a perspective view of a brake actuating unit according to a third embodiment.

FIGS. 2 to 4 show perspective views of the brake actuating unit 2 according to different embodiments. Corresponding and reoccurring features shown in the different figures are denoted using the same reference numerals. The brake actuating unit 2 is a one-box system and comprises a housing 16 accommodating the first cylinder and piston arrangement 3, the brake pedal feel simulator 4, and the brake pedal actuation sensing device 6. The piston rod 17 extends through a rear face 19 of the housing 16. The rear face 19 faces the brake pedal 1 when the unit 2 is installed in the vehicle. A longitudinal axis of the first cylinder and piston arrangement 3 is aligned with an axis of the piston rod 17. A motor housing 18 of an electric motor of the first electrically controllable pressure supply 7 is attached to a side face of the housing 16 so that the electric motor forms a part of a side face 20, i.e., lateral face, of the unit 2. An axis of the electric motor of the first electrically controllable pressure supply 7 is arranged essentially perpendicular to the longitudinal axis of the first cylinder and piston arrangement 3.

The unit 2 further comprises a pressure medium reservoir 21 supplying a pressure medium to the first cylinder and piston arrangement 3. The pressure medium reservoir is attached to a top of the housing 16 and forms a part of a top face 22 of the unit 2. In the one-box system shown, the pressure medium reservoir 21, the first electrically controllable pressure supply 7, the second controllable pressure supply 8, the brake pedal feel simulator 4, the first cylinder and piston arrangement 3, the brake pedal actuation sensing device 6, the hydraulic controller 9 and/or the connectors 10, 11 are rigidly connected with one another to enable a compact design of the unit 2.

As depicted in FIG. 2, the first connector 10 and the second connector 11 may each form a part of the same side face 20 of the unit 2. This side face corresponds to the side face 20 partly formed by the electric motor 18. To receive elongated plugs 23, 24 of the cables 14, 15, the connectors 10, 11 are elongated. The plugs 23, 24 each comprise a printed circuit board and pins oriented perpendicular to the printed circuit board. To achieve a particularly compact arrangement, the first connector 10 and the second connector 11 are oriented such that their axes of elongation are perpendicular. The first connector 10 is oriented essentially horizontally and is disposed in a bottom portion 27 of the unit 2 below the electric motor 18. The second connector 11 is oriented essentially vertically and is disposed in a front portion 25 of the unit 2 in front of the electric motor 18.

FIGS. 3 and 4 show embodiments that require a reduced depth of the unit 2 as compared to the embodiment of FIG. 2. As shown in FIG. 3, both of the connectors 10, 11 may be arranged in the front portion 25 of the unit 2. In this embodiment, the connectors 10, 11 are oriented on the same side face 20 of the unit 2 in such a manner that their axes of elongation are oriented essentially in parallel.

Further, as shown in FIG. 4, a particularly compact arrangement with a reduction of a required length of the unit 2 may be achieved when the connectors 10, 11 are arranged on opposing side faces 20, 26 of the unit 2. In this embodiment, the connectors 10, 11 are both oriented essentially vertically in the front portion 25 of the unit. The connectors 10, 11 are arranged in a back-to-back orientation such that the connectors 10, 11 overlap in a horizontal and vertical direction.

Features of the different embodiments which are merely disclosed in the exemplary embodiments may be combined with one another and may also be claimed individually.

What is claimed is:

1. A brake actuating unit for a brake-by-wire motor vehicle brake system, comprising:
   a housing,
   a first electrically controllable pressure supplying device,
   a second electrically controllable pressure supplying device,
   a brake pedal actuation sensing device electrically connected with at least one of the first electrically controllable pressure supplying device and the second electrically controllable pressure supplying device,
   hydraulic connections to hydraulically connect wheel brakes of the brake system with the first pressure supplying device and the second pressure supplying device of the brake actuating unit,
   a first connector to electrically connect the brake actuating unit with a vehicle control unit and with a power network of the vehicle, wherein the first connector is electrically connected with the first electrically controllable pressure supplying device,
   a second connector to electrically connect the brake actuating unit with the vehicle control unit and with the power network of the vehicle, wherein the second connector is electrically connected with the second electrically controllable pressure supplying device, and
   a piston rod extending through a rear face of the housing for transmitting a displacement of a brake pedal to a piston of the first cylinder disposed in the housing,
   wherein the first connector forms a part of a first side face of the brake actuating unit, the second connector forms a part of a second side face of the brake actuating unit positioned opposite to the first side face of the brake actuating unit, and the first connector and the second connector are disposed in a plane orthogonal an axis of the piston rod.

2. The brake actuating unit of claim 1, wherein the first connector and the second connector are elongated.

3. The brake actuating unit of claim 2, wherein an axis of elongation of the first connector is oriented different from an axis of elongation of the second connector.

4. The brake actuating unit of claim 2, wherein an axis of elongation of the first connector is oriented substantially perpendicular to an axis of elongation of the second connector.

5. The brake actuating unit of claim 1, wherein at least one of the first electrically controllable pressure supplying device or the second electrically controllable pressure supplying device comprises a second hydraulic cylinder and piston arrangement and an electric motor, wherein the piston is displaceable by the electric motor.

6. The brake actuating unit of claim 5, wherein the electric motor forms a part of a side face of the unit, and at least one of the first connector and the second connector is arranged in a front portion of the brake actuating unit, the front portion being in front of the electric motor.

7. The brake actuating unit of claim 1, further comprising a brake pedal feel simulator connected with the first cylinder and piston arrangement.

8. The brake actuating unit of claim 1, further comprising a hydraulic controller to connect the first and/or the second pressure supply with the wheel brakes.

9. The brake actuating unit of claim 1, further comprising a pressure medium reservoir forming at least a part of a top face of the brake actuating unit.

10. A brake-by-wire motor vehicle brake system comprising the brake actuating unit of claim 1 and a first cable, a second cable, the vehicle control unit and the vehicle power network, wherein the first cable electrically connects the first connector of the brake actuating unit with the vehicle control unit and with the vehicle power network, and
the second cable electrically connects the second connector of the brake actuating unit with the vehicle control unit and with the vehicle power network.

* * * * *